US011223854B2

(12) United States Patent
Terpstra et al.

(10) Patent No.: US 11,223,854 B2
(45) Date of Patent: Jan. 11, 2022

(54) BROADCASTING AN INFORMATION SIGNAL HAVING SPECIAL CONTENT FOR TRIGGERING AN APPROPRIATE ACTION IN A USER DEVICE

(71) Applicant: TELETRAX B.V., Eindhoven (NL)

(72) Inventors: Alex Dick Terpstra, Heeze (NL); Jaap Andre Haitsma, Santiago (CL); Martijn Maas, Eindhoven (NL)

(73) Assignee: TELETRAX B.V., Eindhoven (NL)

( * ) Notice: Subject to any disclaimer, the term of this patent is extended or adjusted under 35 U.S.C. 154(b) by 0 days.

(21) Appl. No.: 16/723,412

(22) Filed: Dec. 20, 2019

(65) Prior Publication Data

US 2020/0336774 A1 Oct. 22, 2020

Related U.S. Application Data

(63) Continuation of application No. 14/000,439, filed as application No. PCT/NL2012/050102 on Feb. 21, 2012, now abandoned.

(Continued)

(30) Foreign Application Priority Data

Feb. 24, 2011 (NL) ..................... 2006291

(51) Int. Cl.
*H04N 7/025* (2006.01)
*H04N 21/234* (2011.01)
(Continued)

(52) U.S. Cl.
CPC ......... *H04N 21/23418* (2013.01); *H04N 5/44* (2013.01); *H04N 21/435* (2013.01);
(Continued)

(58) Field of Classification Search
CPC ............ H04N 21/8456; H04N 21/458; H04N 21/454; H04N 21/2543
(Continued)

(56) References Cited

U.S. PATENT DOCUMENTS

2002/0162118 A1   10/2002   Levy et al.
2004/0059933 A1   3/2004    Levy et al.
(Continued)

FOREIGN PATENT DOCUMENTS

CN   102291607   12/2011
EP    2398239    12/2011
(Continued)

OTHER PUBLICATIONS

U.S. Appl. No. 14/000,439, filed Nov. 1, 2013.

*Primary Examiner* — Jivka A Rabovianski
(74) *Attorney, Agent, or Firm* — Barnes & Thornburg LLP; Mark J. Nahnsen

(57) ABSTRACT

The problem is solved by a method for broadcasting a broadcast signal, comprising generating an information signal having in time a first content up to a certain time and a second content after this time. The information signal is broadcast as a broadcast signal via a first communication link. At least one first feature is being provided with respect to the second content, for example an advertisement. The second content is detected in the information signal using the at least one first feature. On detection of the second content in the information signal at least one second feature is extracted from the first content in the information signal preceding the second content. The at least one second feature is sent to a user device using a second communication link, different from the first communication link, the second communication link being faster than the first communication link.

14 Claims, 5 Drawing Sheets

Related U.S. Application Data

(60) Provisional application No. 61/446,161, filed on Feb. 24, 2011.

(51) Int. Cl.

| | | |
|---|---|---|
| *H04N 21/81* | (2011.01) | |
| *H04N 5/44* | (2011.01) | |
| *H04N 21/61* | (2011.01) | |
| *H04N 21/44* | (2011.01) | |
| *H04N 21/458* | (2011.01) | |
| *H04N 21/858* | (2011.01) | |
| *H04N 21/434* | (2011.01) | |
| *H04N 21/435* | (2011.01) | |

(52) U.S. Cl.
CPC ... *H04N 21/4348* (2013.01); *H04N 21/44016* (2013.01); *H04N 21/458* (2013.01); *H04N 21/6175* (2013.01); *H04N 21/812* (2013.01); *H04N 21/8586* (2013.01)

(58) Field of Classification Search
USPC .......................................... 725/32, 135, 136
See application file for complete search history.

(56) References Cited

U.S. PATENT DOCUMENTS

| | | |
|---|---|---|
| 2004/0189873 A1 | 9/2004 | Konig et al. |
| 2004/0194130 A1 | 9/2004 | Konig et al. |
| 2006/0190776 A1 | 8/2006 | Oostveen et al. |
| 2007/0043616 A1 | 2/2007 | Kutaragi et al. |
| 2009/0083788 A1 | 3/2009 | Riley et al. |
| 2009/0226148 A1 | 9/2009 | Nesvadba et al. |
| 2010/0169932 A1 | 7/2010 | Grubb et al. |
| 2010/0269128 A1* | 10/2010 | Gordon ............. H04N 21/2543 725/25 |
| 2011/0307339 A1 | 12/2011 | Riley et al. |

FOREIGN PATENT DOCUMENTS

| | | |
|---|---|---|
| JP | 2005229509 | 8/2005 |
| JP | 2007528144 | 10/2007 |
| JP | 2008510345 | 4/2009 |
| WO | WO 2007/130681 | 11/2007 |

\* cited by examiner

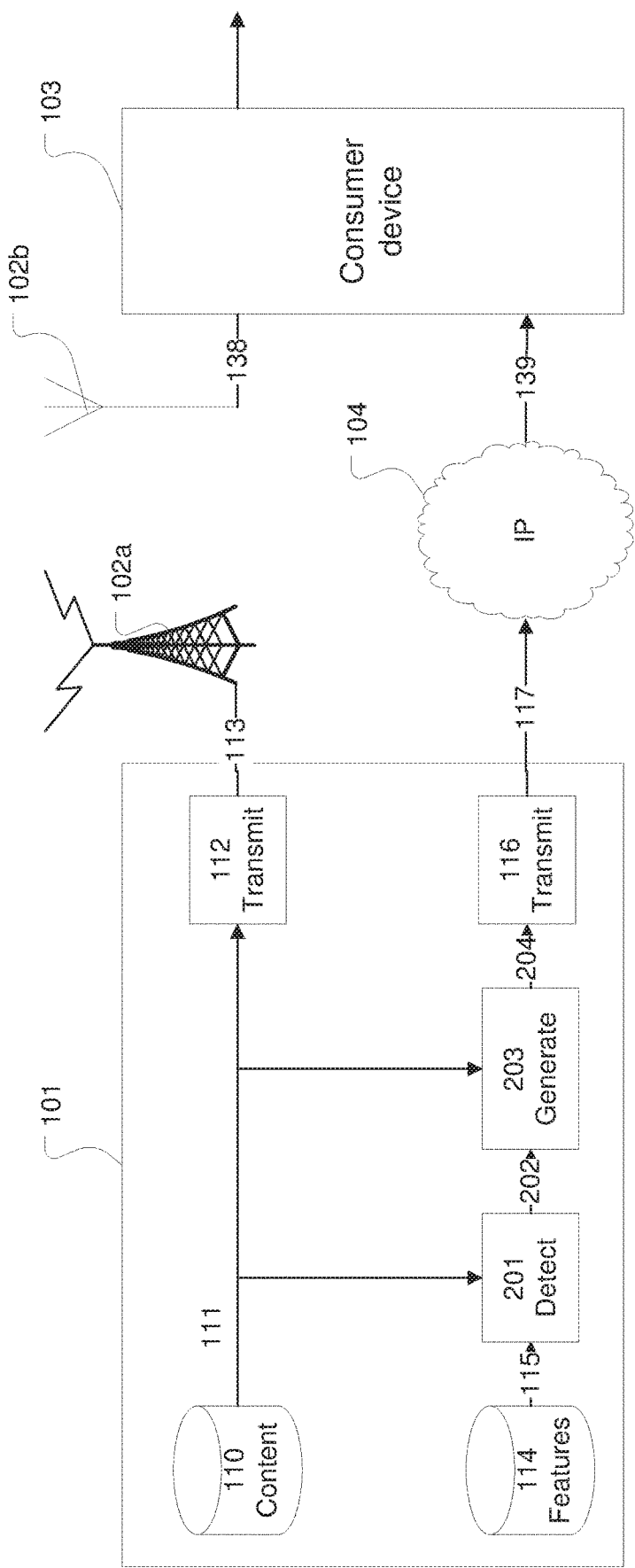
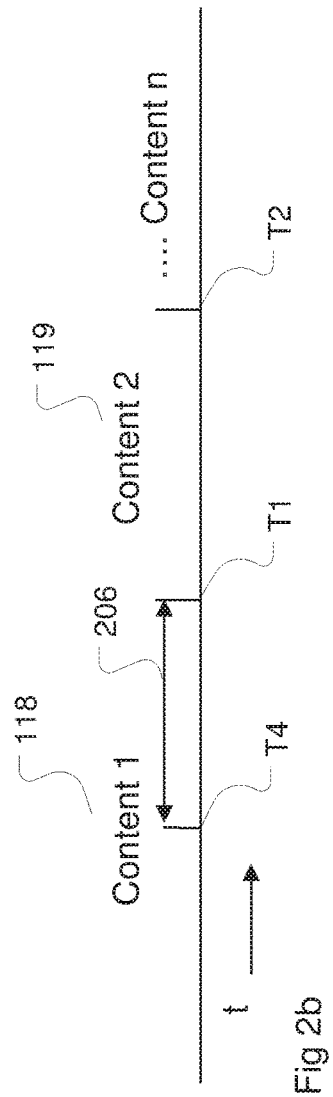

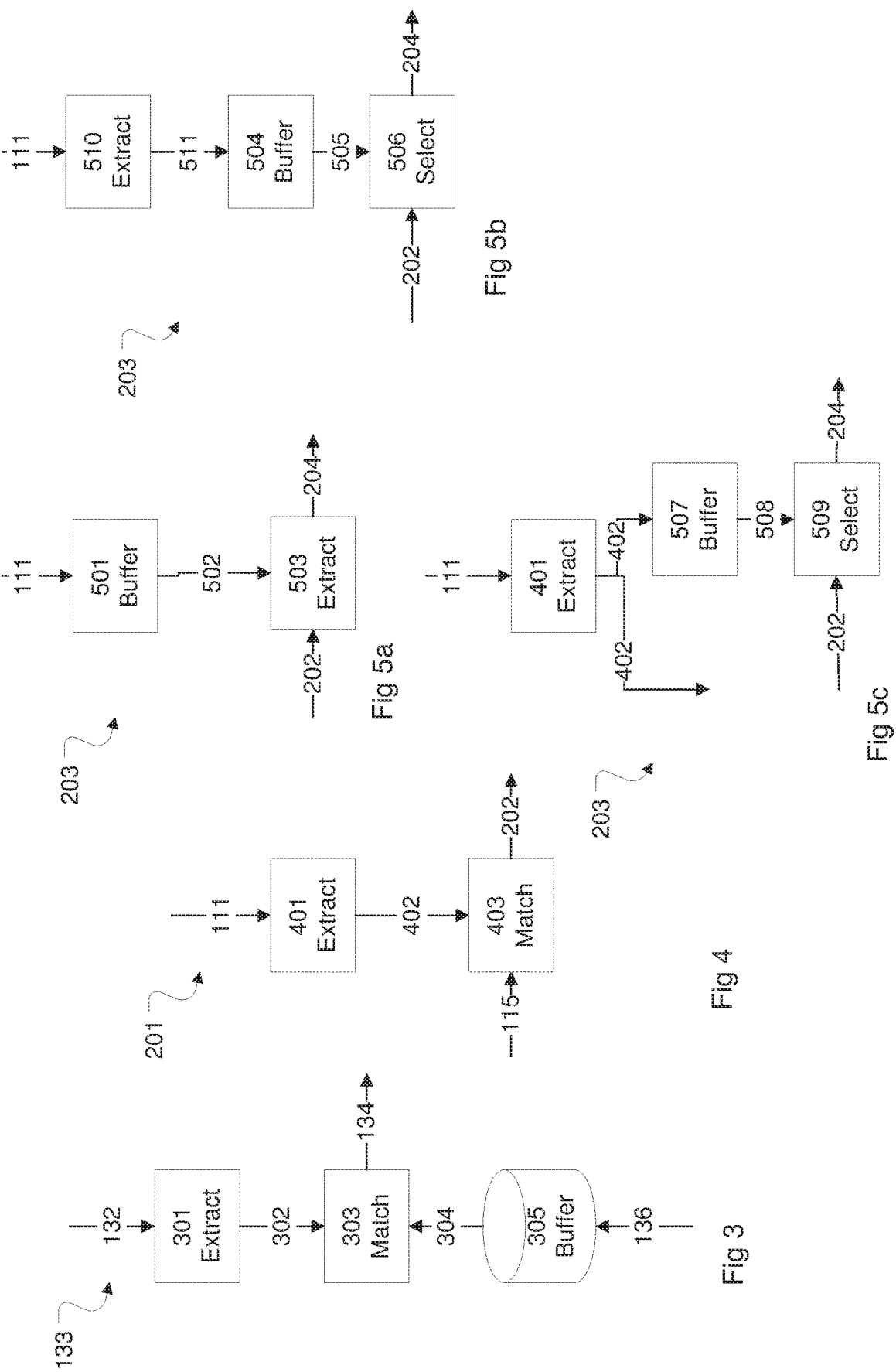

BROADCASTING AN INFORMATION SIGNAL HAVING SPECIAL CONTENT FOR TRIGGERING AN APPROPRIATE ACTION IN A USER DEVICE

CROSS REFERENCE TO RELATED APPLICATIONS

This application is a Continuation of U.S. application Ser. No. 14/000,439, filed Nov. 1, 2013, which is a nationalization under 35 U.S.C. § 371 of International Application No. PCT/NL2012/050102, filed Feb. 21, 2012, which claims priority to Netherlands Application No. 2006291, filed Feb. 24, 2011, and U.S. Provisional Application No. 61/446,161. The disclosures set forth in the referenced applications are incorporated herein by reference in their entireties.

DESCRIPTION

Broadcasting an information signal having special content for triggering an appropriate action in a user device.

Field

The invention relates to a method and system for broadcasting an information signal having special content for triggering an appropriate action in a user device.

Background

In a broadcasting environment, such as television or radio broadcasting, a consumer can render the broadcast content broadcast by a broadcast organisation on a user device, such as a television set or a radio. With the arrival of additional user devices with data processing capabilities, such as set top boxes and the like, user involvement with the content can be enabled. Thus it became possible to perform a content related action within such a device based on the broadcast content. Such an action can for example be substituting a broadcast advertisement, aimed at a general audience, by a substitute advertisement aimed at a specific consumer group, or even an individual consumer. The substitute advertisement may have been obtained via an alternative communication link. Other actions may include turning on or off consumer equipment, enabling new levels or cheats in a game, etcetera. Also user input related to the content can be enabled.

Actions as described above can be triggered by detecting the presence of special content in the broadcast signal. The starting point of the special content in the information signal is called a trigger point. The user device adapted for this purpose may have a separate input for receiving features that enable the device to detect the trigger point and take the appropriate action.

A broadcast organisation can add special content to the content, e.g. a record or a movie, being broadcast to the public, whereby features by which the associated trigger point can be detected are previously extracted from the special content. These features are communicated to the user device. This enables the broadcaster to insert the special content at any time into the content knowing that the user device can detect the special content and let the user device take the appropriate action, independent of the content preceding the special content or the time on which the special content is inserted and irrespective of any hickups such as delays or program changes.

The detection of the trigger point by the user device, may however be subjected to latency of a detector circuit within the user device. It can take seconds or in some cases even minutes to detect the special content. As a consequence the appropriate action which the user device is supposed to perform on receipt of the special content, is disturbed, may be too late, or the substitute content may be preceded by part of the content that was to be substituted due to the latency. Furthermore the content preceding the special content, is normally only known at the moment of broadcasting.

SUMMARY

It is therefore an object of the present invention to overcome the disadvantages as described above.

The object is achieved by a method for broadcasting a broadcast signal, comprising generating an information signal having a first content and a second content after the first content. The information signal is broadcast as a broadcast signal via a first communication link. The second content allows a user device to perform an appropriate action when it is received.

At least one previously determined first feature is being generated with respect to the second content, for example an advertisement. The second content is detected in the information signal using the at least one first feature. On detection of the second content in the information signal at least one second feature is generated for the first content in the information signal preceding the second content. The at least one second feature is sent to the user device using a second communication link, different from the first communication link, the second communication link being faster and/or having less delay than the first communication link.

Using this higher speed, the at least one second feature arrives at the user device while the first content is still being received and the second content is yet to be received. Using the at least one second feature, the first content preceding the second content can be detected. This allows the user device to detect the second content before it arrives. The user device can take appropriate action before or at the moment the second content arrives at the user device. Thus the appropriate action, such as advertisement substitution, is performed irrespective of the detector latency.

A further advantage of the described method is that no modification of the user device is required to relieve the detector latency. The detection of the content preceding the second content, the actual trigger point, can be performed in a user device according to the state of the art.

In an embodiment of the invention, the step of detecting the second content in the information signal comprises extraction of at least one third feature from the information signal. This feature is compared with the at least one first feature for the second content. A detection signal is generated if the at least one third feature matches with the at least one first feature. This enables the detection of the second content solely on the presence of the second content in the broadcast signal.

In a further embodiment, the at least one first feature comprises a first fingerprint of the second content, and wherein the at least one third feature from the information signal comprises a second fingerprint. The second content is detected when the first fingerprint and the second fingerprint match. This allows the detection of the second content in the information signal to be efficiently performed on the basis of signal fingerprinting technology.

In another further embodiment, a first watermark is used to identify the second content. The at least one predetermined first feature now comprises a first payload of the first watermark for the second content and the at least one third feature comprises a second payload of the first watermark extracted from the information signal. The second payload is extracted from the information signal by detection of the first watermark in the information signal and determining the second payload on detection of the first watermark. The second content is detected when the first watermark is detected and the previously determined first payload matches with the second payload from the information signal. This allows the highly reliable detection of the second content to be performed on the basis of watermarking technology.

In an embodiment, the step of generating the at least one second feature of the first content of the information signal comprises buffering the information signal and extracting the at least one second feature from the buffered information signal on detection of the second content in the information signal. By buffering the information signal, the first content preceding the second content is available in the buffer, from which the at least one second feature can be extracted, such that detection of the second content is performed in the user device before the actual arrival of the second content.

The at least one second feature can be a third fingerprint, allowing easy detection of the second content in the user device before it is received on the basis of fingerprinting technology.

As an alternative for fingerprinting, the information signal during broadcast can be provided with a continuously embedded second watermark with a payload. When the second content is detected as described above, the payload of the second watermark can be extracted from the buffered watermarked information signal by detecting the second watermark, determining the payload, and using the payload of the second watermark as the at least one second feature, the at least one second feature corresponding to the first content preceding the second content as a consequence of the buffering. This allows the use of a continuously embedded watermark in the information signal to be used for detection of the second content in the user device before it is received.

In another embodiment, the step of generating the at least one second feature from the first content of the information signal comprises extracting at least one fourth feature from the information signal, buffering the at least one fourth feature and selecting the buffered at least one fourth feature as the at least one second feature upon detection of the second content as described above. The at least one second feature corresponds to the first content preceding the second content in the information signal due to the buffering of the fourth feature.

The at least one fourth feature and subsequently the at least one second feature to be sent to the user device can be a fingerprint of the content in the information signal.

As an alternative for fingerprinting, the information signal during broadcast can be provided with the continuously embedded second watermark with a payload as described above. In the case where the second watermark has previously been inserted, before generating the information signal, when the second content is detected, the payload of the second watermark can be extracted from the watermarked information signal as the at least one fourth feature, by detecting the second watermark, and determining the payload. The payload of the second watermark is subsequently buffered. In the case the second watermark is inserted when generating the information signal, the payload of the second watermark does not need to be detected and can be buffered while embedding the second watermark with the payload.

Upon detection of the second content the buffered payload of the second watermark is selected as the at least one second feature corresponding to the first content preceding the second content. This also allows the use of a continuously embedded watermark in the information signal to be used for detection of the second content in the user device before it is received.

In a variant of the above embodiment, the at least one fourth feature is equal to the at least one third feature from the detection process, where the at least one third feature was obtained by the feature extraction from the information signal for the detection of the second content. The buffering enables the selection of the at least one second feature relating to the first content preceding the occurrence of the second content in the information signal. Since such features are in the buffer, mere selection of the appropriate features is sufficient to obtain the at least one second feature to be send to the user device.

Using the feature extraction of the detector of the presence of the second content facilitates easy generation of the at least one second feature, the at least one second feature being of the same kind as the at least one third feature extracted from the information signal.

In another embodiment, the information signal can be provided with a second watermark having a payload. The payload can have a first timestamp, which is continuously updated, indicating the current time of day and/or date of generating the information signal. The step of generating the at least one second feature comprises generating on detection of the second content in the information signal the at least one second feature comprising a second timestamp, wherein the second timestamp value is derived from the timestamp value of the first timestamp such that it corresponds to a first timestamp value associated with the first content preceding the second content in the information signal. This allows an efficient way of generating a feature for the user device to detect the first content preceding the second content, without the need of buffering the information signal or the second watermark payload.

In yet another embodiment, the step of generating the at least one second feature comprises generating a payload for a third watermark upon detection of the second content. The method further comprises buffering the information signal and embedding the third watermark in the first content of the buffered information signal preceding the second content. The watermarked buffered information signal is subsequently broadcast via the first communication link to the user device. The payload of the third watermark is sent as the at least one second feature by the generator to the user device using the second communication link.

The user device has previously been provided with the third watermark. This allows the user device to perform detection of the second content in the received information signal having the third watermark and payload received via the second communication link, such that the watermark and payload can be detected in the first content before the second content is received.

In the abovementioned embodiments the at least one second feature can contain a channel identification and a trigger point identification indicating respectively the channel on which the second content is to be received by the user device and the identification of the start of the second content where an action is to be performed by the user device corresponding to or associated with the second content.

The object of the invention is also achieved in a broadcast arrangement for broadcasting a broadcast signal, the system comprising a first generator for generating an information signal having in time a first content up to a certain time and a second content after this time. The arrangement further comprises a first transmitter for broadcasting the information signal as broadcast signal via a first communication link. The arrangement further comprises a source for providing at least a first feature with respect to the second content, a detector for detecting the second content in the information signal using the at least one first feature, and a second generator for generating at least one second feature from the first content of the information signal in time preceding the second content. The arrangement further comprises a second transmitter for sending the at least one second feature via a second communication link for the first content to a user device. The arrangement is further adapted for executing the steps of the method described above.

BRIEF DESCRIPTION OF THE DRAWINGS

FIG. 2a shows a block diagram of a broadcast system for broadcasting a broadcast signal, providing trigger point data and a user device for detecting trigger points in the broadcast signal using the trigger point data according to the invention.

FIG. 2b shows a timing diagram of a broadcast signal with a trigger point according to the invention.

FIG. 3 shows a block diagram of a trigger point detector for use in a user device according to the state of the art.

FIG. 4 shows a block diagram of a trigger point detector for a broadcast arrangement according to the invention.

FIG. 5a shows a block diagram of a feature generator for a broadcast arrangement according to the invention.

FIG. 5b shows a block diagram of an alternative feature generator for a broadcast arrangement according to the invention.

FIG. 5c shows a block diagram of yet an alternative feature generator for a broadcast arrangement according to the invention.

DETAILED DESCRIPTION

Figures 1A, 1B:
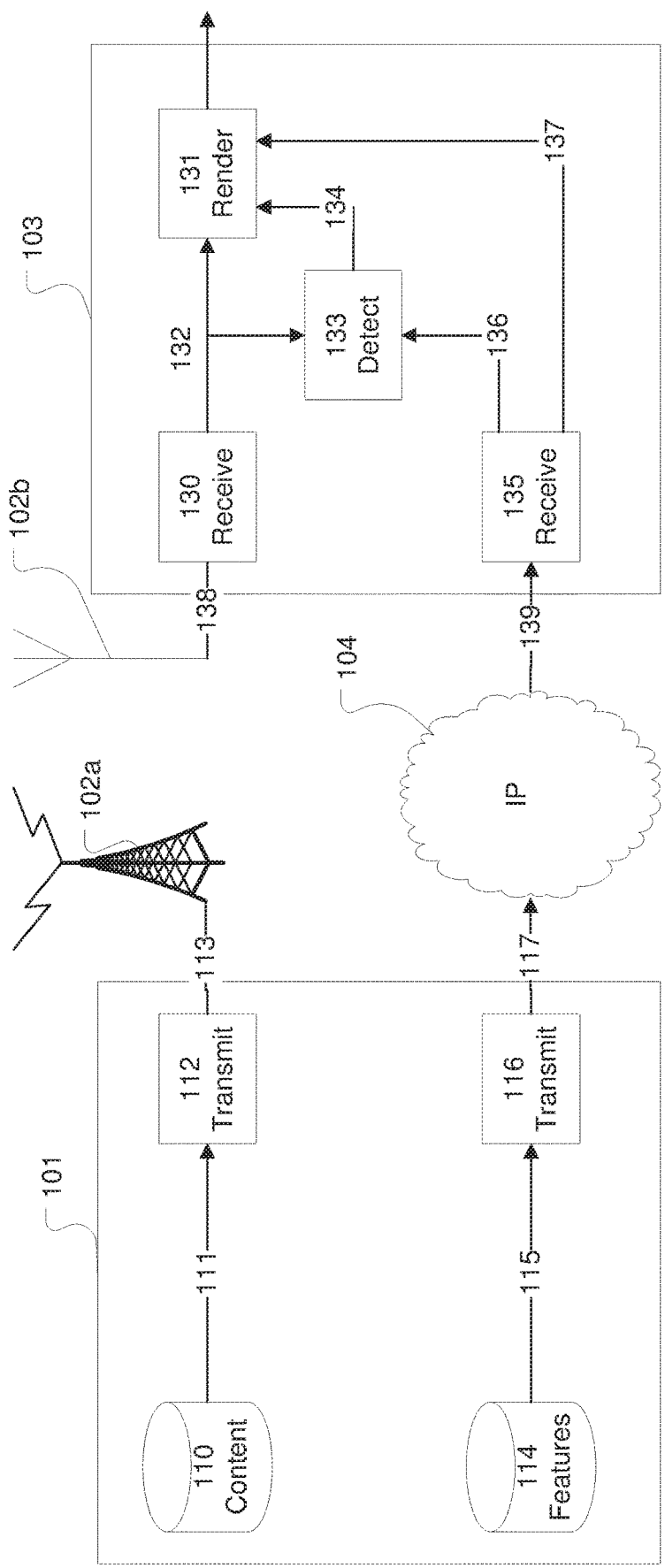
FIG. 1a shows a block diagram of a broadcast system for broadcasting a broadcast signal according to the state of the art.
FIG. 1b shows a timing diagram of a broadcast signal with a trigger point according to the state of the art.

A broadcast system 101, 102a, 102b, 103, 104 according to the state of the art shown in FIG. 1a is subdivided in two subsystems, a broadcast arrangement 101 and a user device 103, interconnected by two communication links, a first communication link 102a, 102b being a broadcast link and a second communication link being a data network connection 104, using for example the Internet protocol (IP). The broadcast link 102a, 102b is usually a wireless or radio link, as shown in FIG. 1a, however wired or partially wired and partially wireless connections can likewise be applied.

The broadcast arrangement 101 represents a typical broadcast infrastructure comprising a content generator 110, which can generate an information signal 111 with first and second content from the content storage, which is transmitted 112 via the first communication link 113, 102a, 102b, 138 to the user device 103. The content 110 comprises any first content that may be fit for broadcast distribution, frame oriented television broadcast, or continuous radio broadcast, such as music records, movies, news programs, sporting events report etcetera. These items can contain or can be extended with special second content which enable a user device 103 to perform a certain pre-programmed appropriate action. Such special second content can be advertisements, or preselected scenes in any of the previously mentioned content items.

The process for introducing the special second content is not shown in FIG. 1a, since there are various ways to perform this. It is for example possible to add such special content on the fly, while the process of broadcasting the main content is in progress. The content for broadcasting including first and second content can also be prepared and stored in advance, where for example movies and other content are mixed with the special second content, and broadcast at a later time. The special second content can also be designated in the first content in a script using time slots.

The beginning of the special second content is defined as a trigger point. The special second content can be analysed prior to broadcasting to extract features relating to the trigger point that enable the user device 103 to detect the special content when the broadcast signal is received 102b, 130 and take appropriate action. Such features can either be generated on the fly and transmitted 116 to the user device while the special content is being inserted into the main content or be stored in a trigger point feature repository 114 from which these features 115 are transmitted 116 to the user device 103 via the second communication link 117, 104, 139 before broadcasting the content. In practise, the generation of the information signal and maintenance of the trigger point feature repository can be under the control of different organisations such as a broadcast organisation and an advertisement agent respectively.

Additional information relating to the trigger point can be at least one of a trigger point identification, the desired action to be taken by the user device 103 receiving it such as advertisement substitution and can for example also refer to substitute content. The additional trigger point information can also be stored in the trigger point feature repository 114 and subsequently communicated to the user device 103, allowing that when the trigger point features are detected, the trigger point can be properly identified and the desired action to be taken. The additional information can also comprise a channel identification on which the trigger point is to appear, in order to avoid false triggering by the user device 103 on receipt of the trigger point on a different channel then intended, where the appropriate action was not foreseen.

Nowadays various user devices 103 have an Internet connection, so the trigger point features 115 may be transmitted 116 using a data connection 117, 104, 139 via for example, but not limited to, the Internet using Internet Protocol (IP).

The exemplary user device 103 of FIG. 1a has an input 138 for the broadcast communication link 102a 102b for receiving the broadcast content. Receiver 130 restores the information signal 132 broadcast from the broadcast system 101 having the first and second content. The content is supplied to a rendering device 131 which for example can be a graphical display unit or a device for transforming the information signal into a modulated signal for further processing in for example a television unit.

Trigger point information relating to the second content comprising features and optional additional information is received via input 139 by the receiver 135. The features 136 of the trigger points are sent to the detector 133. Additional information 137, such as a trigger point identification or other additional information is made available to the rendering device 131 for processing when the associated trigger point is detected.

FIG. 1b shows an example of an information signal having first content 118 and second 119. The second content stretches from time T1 tot time T3. The signal in FIG. 1b has a trigger point at T1 indicating a change from first content 118 to second content 119, having features 120 stretching from time T1 to time T2 by which the trigger point may be detected. When this information signal is received 130 by the user device 103, the trigger point may be detected 133 using features relating to the trigger point which have been received from the trigger point repository 114 of the broadcast system 101. It may take detector 133 from time T1 to time T2 to receive the features and from T2 to T2+L to detect the trigger point, the time T2 to T2+L (121) being the detector latency. The total latency $L_{tot}=T2-T1+L$ is thus determined by the time for receiving the trigger point features and time to detect.

If the rendering unit 131 is for example instructed to substitute the second content with a pre-stored advertisement directed to the individual user of user device 103, then during time T1 to time T2+L the second content 119 is still displayed to the user. This is an undesired situation.

FIG. 3 shows an example of a detector 133 for use in a user device 103 for detecting trigger points in an information signal 132. The detector 133 receives features 136 relating to trigger points from the receiver 135 and stores these in a buffer 305. Extractor 301 extracts features from the information signal, which features 302 are provided to a matching unit 303. The matching unit 303 matches the features 302 with the features 304 in the buffer 305. A match can be determined by logically comparing the extracted features 302 with the buffered features 304, or by mathematically comparing the extracted features 302 with the buffered features. The latter can involve a correlation function. When a match is found, a match signal 134 is send to the rendering unit 131, which can then take the appropriate action.

FIG. 2a shows a broadcast system with broadcast arrangement 101 according to the invention and the user device 103, the broadcast arrangement 101 being arranged for broadcasting content and generating trigger point features for the user device 103. The broadcast arrangement 101 comprises a trigger point feature repository 114 and a generator 110 for the information signal 111 having the first and second content. Detector 201 detects a trigger point, being the start of the second content in the information signal, using the features 115 from the trigger point repository 114 and produces a match detection signal 202 when a match is found. A matching function used in detector 201 of the broadcast arrangement 101 for determining a match between features in the content of the information signal 111 and the features 115 from the trigger point repository 114 is similar to the matching function in detector 133 of the user device 103.

On detection 202 of a trigger point in the information signal 111 feature generator 203 extracts features 204 from the first content 118 preceding the second content 119. These features 204 are then supplied to the transmitter 116, where applicable completed with additional trigger point information from the original trigger point 115 such as trigger point identification or channel identification, and sent via the second communication link 117, 104, 139 to the user device 103.

In the transmission it is assumed that the broadcast signal via the first communication link 113, 102a, 102b, 138 is prone to delay with respect to or is slower than the second communication link 117, 104, 139. So the trigger point information 204 arrives at the user device 103 before the trigger point relating to the second content arrives. The user device 103 can now detect the trigger point using the received (see 136 in FIG. 1a) new features in the first content preceding the trigger point i.e. the second content, before the trigger point has actually arrived at the user device.

FIG. 2b shows a timing diagram of the information signal 111 having first content 118 and second content 119, where it is shown that on detection of the original trigger point in the second content 119 according to FIG. 1a, the generator 203 can extract features from the part 206 of the first content in the information signal 111 preceding the trigger point, starting from time T4 to T1, which features 204 are transmitted 116 to the user device 103. Also generator 203 can generate a feature, embed this (see FIG. 7) in the first content of information signal preceding the second content and send the feature to the user device 13. The information signal 132 having the feature is received 130 via the first communication link 102a, 102b, 138 by the user device 103 where the feature can be detected 133 using the received feature. By taking an appropriate time T4 with respect to T1, the total latency $L_{tot}$ of detecting the trigger point may be compensated.

FIG. 4 shows a detector 201 for use in the broadcast arrangement 101. Extractor 401 extracts features 402 from the information signal 111. The extracted features 402 are matched in matching unit 403 with features 115 from the trigger point repository 114. When a match occurs, using a matching function as described, the match detection signal 202 is sent to extractor 203. Additionally the feature repository 114 can contain trigger point identities associated with the features. Thus detector 201 can include a trigger point identity associated with the detected second content in the match detection signal 202.

The extraction of features can be based on various techniques, such as fingerprinting and watermarking.

Fingerprinting is a well known technique in the art of signal processing, i.e. processing of video and audio signals. Fingerprinting applies to features determined from the content of an information signal based on at least one of signal amplitude level, the signal envelope, frequency content, etcetera for continuous signals and presence of shapes, movement, colour composition etcetera for frame based signals. Accordingly in an embodiment for detector 201, fingerprints 402 extracted 401 from the information signal 111 can be matched 403 to prestored fingerprints 115. On a match, detector 201 subsequently outputs the match detection signal 202 that the second content is detected and where applicable the trigger point identity value.

Watermarking is also a well known technique in the art of signal processing. Watermarking involves embedding additional information in an information signal using for example a pseudo random code such that the additional information is hardly visible and does not disturb the viewer. The watermark can be embedded with a payload. The payload refers to additional data added to the watermark. These data may for example contain a time stamp and a channel identification. This can be performed by adding a timestamp representing current time of day and/or date, a counter value which is continuously updated, or identification numbers related to the content items in the information signal and combinations of these. Thus enabling identification of and distinguishing between different parts of the content in the information signal using the payload.

The second content can be provided with a watermark, where the payload is an identification of the trigger point. This enables the detection of for example various advertisements as second content having the same watermark, but each having a different payload. Accordingly in detector 201, extractor 401 detects the watermark for the second content in the information signal 111 and extracts the payload.

Where the payload contains a trigger point identity, it is now possible for the detector to output the detection of the watermark and the trigger point identity value as the match detection signal 202. This is not shown in FIG. 4.

If detection is to be made on the basis of a selection of trigger point identities, the payload can be subsequently matched 403 to prestored payloads 115 representing the trigger point identities for which the user device is to perform the appropriate action. On a match, detector 201 subsequently outputs the match detection signal 202 that the second content is detected and where applicable the trigger point identity value.

FIG. 5a shows an example of a feature generator 203. The information signal 111 is stored in buffer 501, such that a certain history of the information is available for feature extraction. In other words, the buffered information signal 502 behaves like a delayed information signal 111. Upon detection of the second content 202, the extractor 503 extracts the at least one second features from the buffered information signal 502. The delay of the buffer 501 is such that the at least one second features can be extracted from the information signal prior to the presence of the second content in the information signal. The extracted at least one second features 204 are then forwarded to transmitter 116 for transmission 117, 104, 139 to the user device 103.

FIG. 5b shows an alternative configuration for feature generator 203. Extractor unit 510 extracts features from the information signal 111. The features 511 are stored in buffer 504, providing sufficient delay for selector 506 to select upon detection of a match 202 in detector 201 the features 505 from buffer 504 corresponding to the first content preceding the trigger point, relating to the original trigger point in the information signal 111. The selected features are then forwarded as the at least one second features 204 to the transmitter 116 for transmission 117, 104, 139 to the user device 103.

FIG. 5c shows another alternative configuration for feature generator 203, where the at least one second feature to be sent is of the same type as the at least one third feature used for detection of the second content. Feature generator 203 uses the output 402 of the extractor unit 401 of detector 201 for obtaining features from the information signal 111. The features 402 are stored in buffer 507 providing sufficient delay for selector 509 to select upon detection of a match 202 in detector 201 the features 508 from buffer 507 corresponding to the first content preceding the trigger point, relating to the original trigger point in the information signal 111. The selected features are then forwarded as the at least one second features 204 to the transmitter 116 for transmission 117, 104, 139 to the user device 103.

In the description of FIGS. 5a-5c the extractors 401, 503 and 510 can relate to fingerprinting. Thus the features 402, 511 and subsequently the at least one second feature 204 can be features obtained through a fingerprinting process.

Alternatively in the description of FIGS. 5a-5c the extractors 401, 503 and 510 can relate to watermarking. Thus the features 402, 511 and subsequently the at least one second feature 204 can be a payload obtained through a watermarking extraction process. Where for example the first content is provided with a watermark having a payload, extractors 401, 503 or 510 can detect the watermark and extract the payload, which payload is forwarded as feature 204 allowing the user device 103 to detect the trigger point, i.e. the second content, in advance of the appearance of the second content.

Since for example advertisements may be present on various broadcast channels at the same time, it is undesirable that the user device takes action on a trigger point appearing on the wrong channel. It was already mentioned that addition trigger point information can be provided via the second communication link 117, 104, 139 together with the at least one second features by which the trigger point is to be detected. Channel identification constitutes such additional information. Furthermore, to make sure that the channel can be unambiguously identified in the user device 103, the broadcast signal 113 can be provided with a watermark having the channel identification as payload. An example for watermarking the broadcast signal is shown in FIG. 6.

Figure 6:
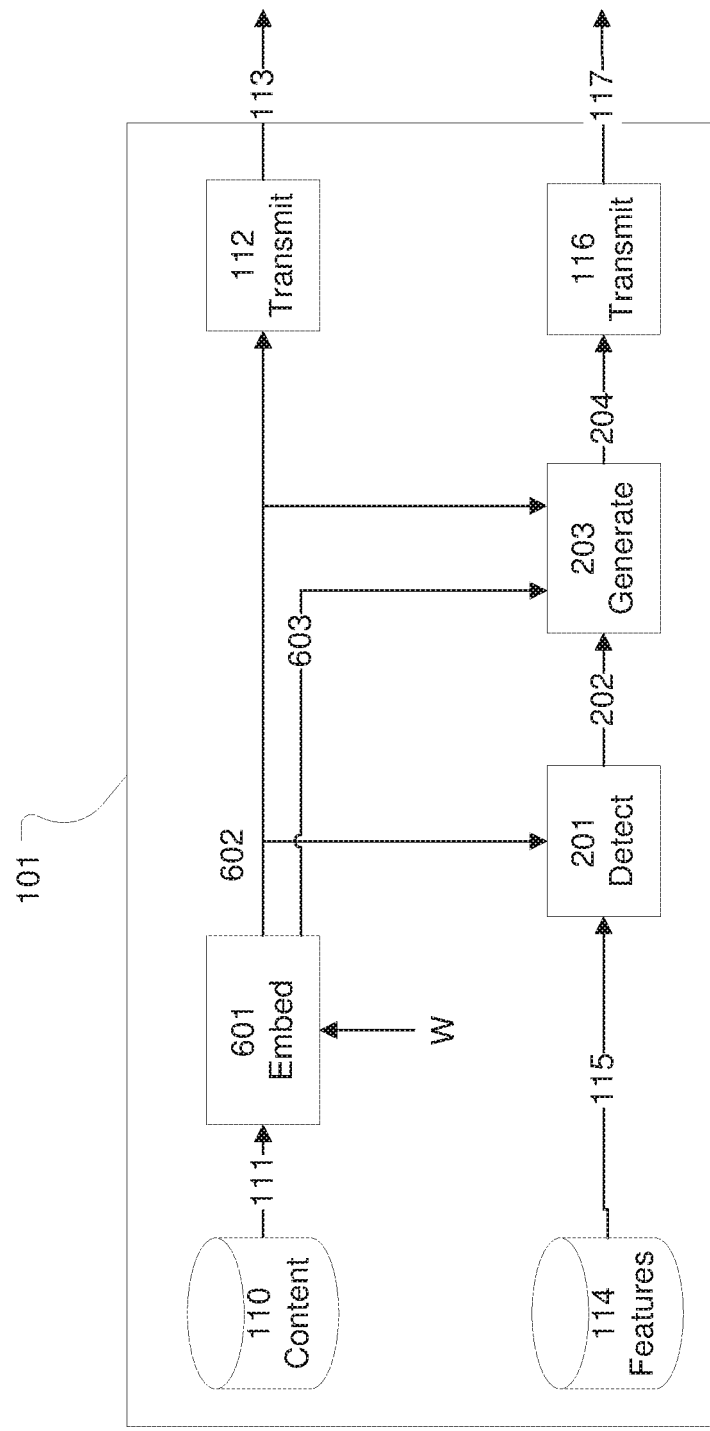
FIG. 6 shows a block diagram of a broadcast arrangement according to the invention with continuous watermarking.

FIG. 6 shows a block diagram of a broadcast arrangement according to the invention with continuous watermarking. Embedder 601 continuously embeds a watermark 'W' in the information signal 111 with a payload, where the payload can have a timestamp, the value of which is continuously updated with the current time of day and/or date, and optionally a channel identification.

Detection 201 of the second content, and generation 203 of the at least one second feature 204 is now performed on the watermarked information signal 602 as previously described. The detection 201 in FIG. 6 is after embedding watermark 'W'. The skilled person will understand that detection 201 of the second content can also take place in the information signal 111 before embedding 601 the watermark 'W'. The embedding 601 of the watermark is an embodiment for the benefit of generation 203 of the at least one second feature for the user device 103.

When the trigger point is detected 202, the current time stamp value and channel identification information can be included in the at least one second feature 204, in addition to the features (fingerprints) of the trigger point. At the user device 103, the watermark W can continuously be detected. In case of detection 133 of the trigger point, for example by means of fingerprint matching, the time stamp and channel identification in the payload can aid in checking the channel and time, or may be used to speed up detection.

At the time of detection 202 of the trigger point, the feature generator 203 can optionally use the current timestamp and/or channel identification to provide the user device 103 with an alternative at least one second feature. The timestamp value taken from the payload 603 represents the time of detection 202 of the second content. The at least one second feature 204 can be generated using the current timestamp value to derive a timestamp value corresponding to the timestamp value of the watermark 'W' payload associated with the first content preceding the trigger point by for example subtracting a time proportional to the elapsed time between the presence of the first content and the detection of the second content from the timestamp value associated with the detection of the second content. The derived timestamp value and where applicable further specifics of the trigger point such as trigger point identification and channel identification can be sent to the user device 103. The skilled person will understand that a similar result can be achieved using a counter value in the payload which is updated at regular intervals whereby the different parts of the content in the information signal 602 can be identified.

The user device 103, continuously monitoring the watermark W in the received information signal 132 detects the payload and matches the timestamp value in the payload with the derived timestamp value received from the broadcast arrangement 101 and performs its appropriate action 131 accordingly, before the trigger point is received.

Figure 7:
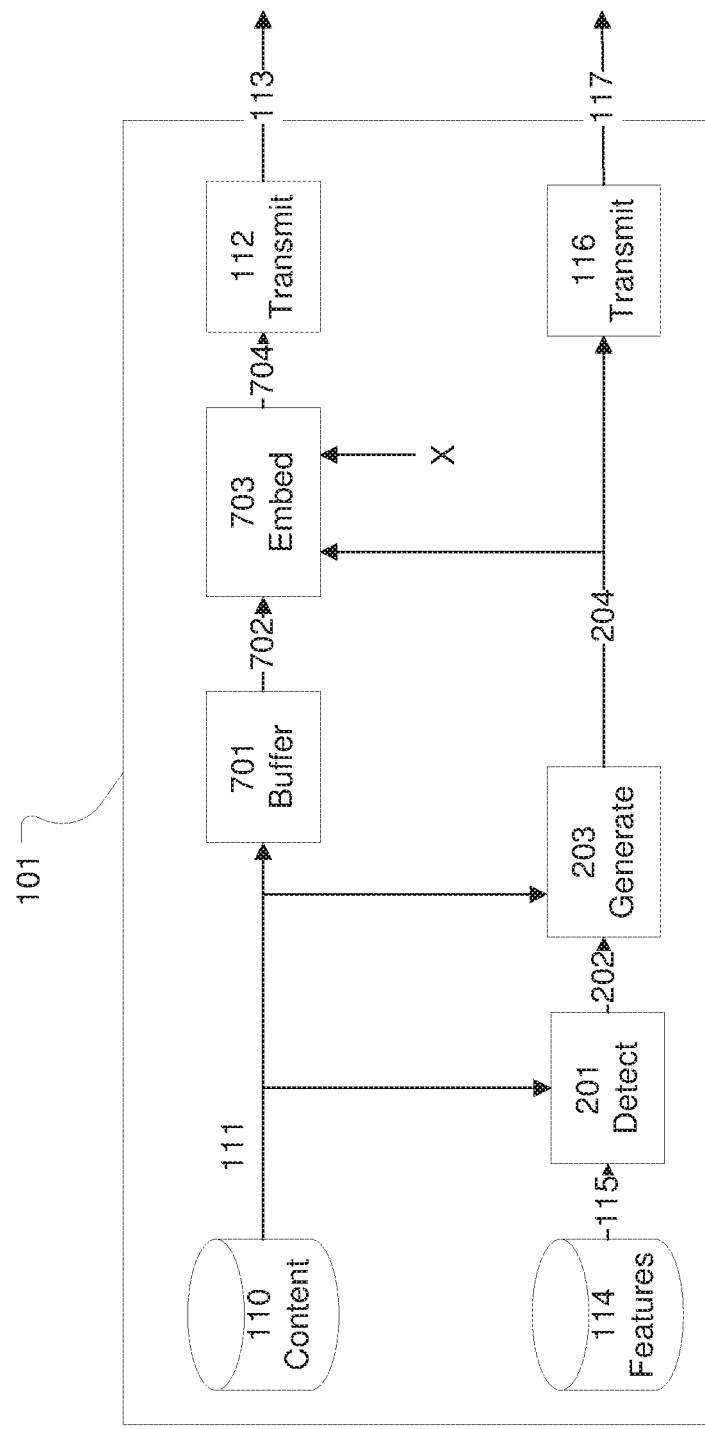
FIG. 7 shows a block diagram of a broadcast arrangement according to the invention with watermarking of the information signal on detection of a trigger point.

FIG. 7 shows a block diagram of a broadcast arrangement according to the invention with watermarking of the information signal on detection of a trigger point. The information signal 111 is delayed in buffer 701. When the second content is detected 201, the feature generator 203 generates a payload 204. This is payload is added to watermark X and embedded in the first content preceding the trigger point, in the delayed information signal 702. The payload can contain an identity of detected trigger point detected by detector 201, or may be of general form including time stamp and channel identification as described under FIG. 6. The at least one second features 204 are now formed by the payload in watermark X in the first content instead of the fingerprints. In the user device 103, the detection 133 is performed on the payload instead of fingerprints.

Alternatively, it may be considered to generate 203 a unique watermark upon detection 202 of the second content and embed 703 this watermark in the delayed information signal 702 and send the unique watermark as at least one second feature 204 to the user device 103. The user device 103 can in such case detect 133 the trigger point using the unique watermark.

The embodiments described above are given by example only. Variations to these embodiments can be obviously made by the skilled person, without departing from the scope of the invention as set out by the following claims.

The invention claimed is:

1. A method for broadcasting a broadcast signal, comprising at a broadcast arrangement:
generating an information signal having broadcast content and subsequently special content that enables a user device to perform a pre-programmed action;
broadcasting the information signal from the broadcast arrangement via a first communication link;
generating at the broadcast arrangement at least one previously determined trigger point defining the beginning of the special content;
detecting at the broadcast arrangement the special content in the information signal using the at least one previously determined trigger point;
generating from the broadcast arrangement at least one feature from the broadcast content preceding the trigger point upon detection of the special content in the information signal;
sending from the broadcast arrangement the at least one feature for the broadcast content to a user device via a second communication link.

2. Method according to claim 1, wherein detecting comprises:
extracting at least one second trigger point from the information signal;
comparing the at least one second trigger point with the at least one previously determined trigger point defining the beginning of the special content;
generating a detection signal if the at least one second trigger point matches the trigger point.

3. Method according to claim 2, wherein
the at least one predetermined first trigger point comprises a first fingerprint for the special content; and wherein the at least one second trigger point from the information signal comprises a second fingerprint.

4. Method according to claim 2, wherein the at least one predetermined first trigger point comprises a first payload of a first watermark for the special content, wherein the at least one second trigger point comprises a second payload of the first watermark from the information signal; and wherein
extracting the at least one second trigger point comprises detecting the first watermark; and
determining the second payload upon detection.

5. Method according to claim 1, wherein the generating of the at least one feature for the broadcast content of the information signal preceding the special content comprises:
buffering the information signal; and
extracting the at least one feature from the buffered information signal of the broadcast content preceding the special content upon detection of the at least one trigger point in the information signal.

6. Method according to claim 3, wherein the at least one feature is a third fingerprint.

7. Method according to claim 4, further comprising
providing the information signal with a second watermark (W) with a payload, wherein the method is being executed with the watermark information signal; wherein
extracting the at least one feature from the buffered information signal comprises detecting the second watermark (W) and determining the payload of the second watermark (W); wherein
the at least one feature comprises the payload of the second watermark (W).

8. Method according to claim 1, wherein the generating of the at least one feature for the broadcast content of the information signal comprises:
extracting at least one other feature from the information signal;
buffering the at least one other feature;
selecting the at least one feature from the buffered at least one other feature upon detection of the at least one first feature in the information signal.

9. Method according to claim 8, wherein the at least one other fourth feature is a fourth fingerprint.

10. Method according to claim 8, further comprising:
providing the information signal with a second watermark (W) having a payload, wherein the method is executed with the watermarked information signal; wherein
extracting of the at least one other feature comprises detecting the second watermark in the watermarked information signal and determining the payload of the second watermark; and wherein
the at least one other feature is the determined payload of the second watermark.

11. Method according to claim 1, further comprising:
providing the information signal of a second watermark having a payload, wherein generating the at least one feature for the broadcast content of the information signal comprises:
buffering the payload of the second watermark (W);
selecting the at least one second watermark from the buffered payload of the second watermark (W) upon detection of the at least one trigger point in the information signal.

12. Method according to claim 1, further comprising:
providing the information signal with a second watermark (W) having a payload, wherein the payload of the second watermark comprises a first time stamp; and wherein generating of the at least one feature for the first broadcast content of the information signal comprises:

generating the at least one feature having a second time stamp derived from the first time stamp from the payload, such that it corresponds to a value of the first time stamp associated with the broadcast content preceding the special content in the information signal upon detection of the special content.

13. Method according to claim 1, wherein generating the at least one feature comprises generating a payload of a third watermark (X) upon detection of the special content; the method further comprising:

buffering of the information signal; and embedding the third watermark (X) having the payload in the buffered information signal in the broadcast content preceding the special content; and broadcasting the buffered watermarked information signal via the first communication link.

14. A broadcast arrangement for broadcasting a broadcast signal at the broadcast arrangement, comprising:

a first generator for generating an information signal having a broadcast content and subsequently a special content;

a first transmitter for broadcasting the information signal as broadcast signal via a first communication link;

a source for generating at least one trigger point with respect to the special content;

a detector for detecting the special content in the information signal, using at least one trigger point;

a second generator for generating the at least one feature for the broadcast content of the information signal preceding the special content upon detection of the special content in the information signal;

a second transmitter for sending at least one feature for the first broadcast content to a user device via a second communication link wherein the arrangement is further adapted for executing the steps of the method according to claim 1.

* * * * *